No. 632,199. Patented Aug. 29, 1899.
T. PERRIN.
STEAM COOKER.
(Application filed May 18, 1899.)
(No Model.)
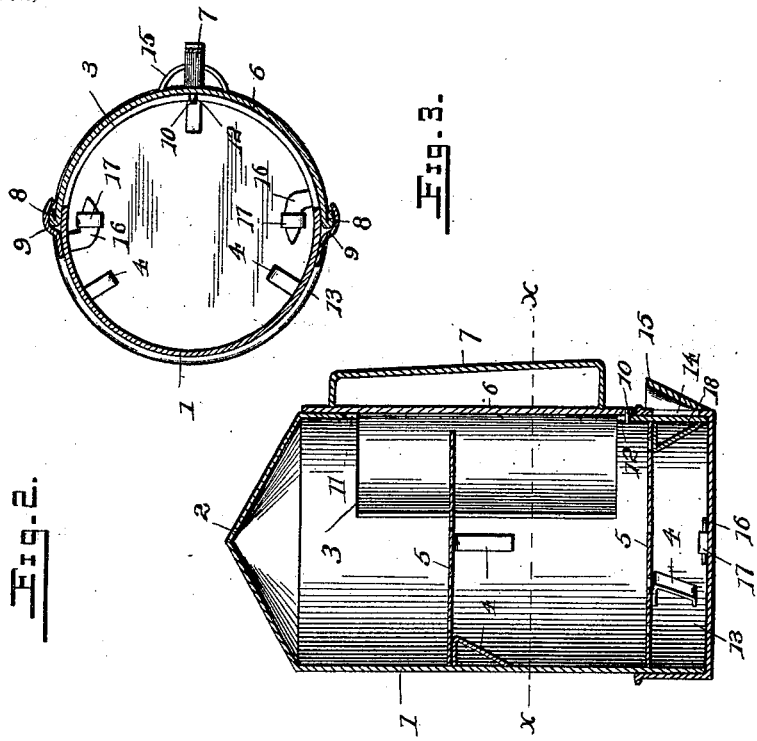
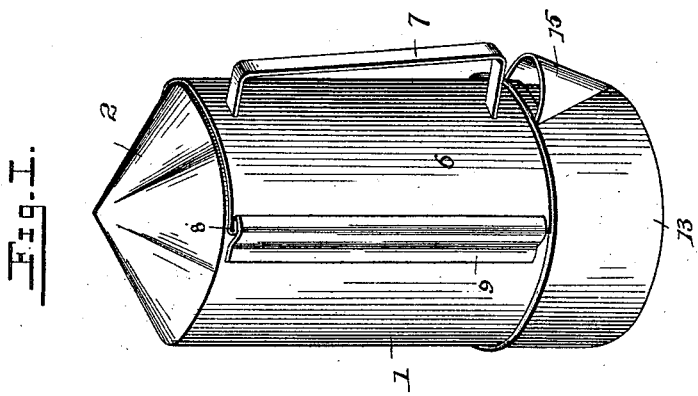
Witnesses
F. E. Alden.
Thomas Perrin, Inventor.
By his Attorney
THE NORRIS PETERS CO., PHOTO-LITHO., WASHINGTON, D. C.

UNITED STATES PATENT OFFICE.

THOMAS PERRIN, OF SEDALIA, MISSOURI.

STEAM-COOKER.

SPECIFICATION forming part of Letters Patent No. 632,199, dated August 29, 1899.

Application filed May 18, 1899. Serial No. 717,302. (No model.)

*To all whom it may concern:*

Be it known that I, THOMAS PERRIN, a citizen of the United States, residing at Sedalia, in the county of Pettis and State of Missouri, have invented a new and useful Steam-Cooker, of which the following is a specification.

This invention relates to steam-cookers for domestic use and is adapted to be placed upon the top of a common or ordinary cooking-stove, so as to generate steam whereby the articles of food are adapted to be cooked; and the object of the invention is to provide an improved form of drum or casing adapted to contain the articles of food to be cooked and a removable pan or receptacle adapted to contain the water from which the steam is to be generated.

A further object is to provide means for entirely closing the water pan or receptacle, so as to effectually prevent the escape of steam to the exterior air and confine the steam entirely within a drum or casing.

To these ends the present invention consists in the combination and arrangement of parts, as will be hereinafter more fully described, shown in the accompanying drawings, and particularly pointed out in the appended claims.

In the drawings, Figure 1 is a perspective view of the device. Fig. 2 is a longitudinal sectional view thereof. Fig. 3 is a plan section taken on the line $x\,x$, Fig. 2.

Corresponding parts are designated by like reference characters in all figures of the drawings.

Referring to the accompanying drawings, 1 designates the casing or drum, of cylindrical form, having a conical top 2, closing the upper end of the drum, while the lower end thereof is open. An entrance-opening 3 is provided in one side of the drum and extends nearly the entire length thereof and through which the dishes or vessels containing the food to be cooked are adapted to be introduced into the interior of the drum. Connected to the inner walls of the drum and projecting laterally inward therefrom is a plurality of brackets 4, adapted to support removable perforated racks 5, upon which the vessels or dishes are adapted to be placed.

To close the entrance-opening 3, a vertically-slidable door 6 is provided and has an exterior operating-handle 7. The longitudinal edges of the door are bent back upon themselves, as at 8, so as to stiffen the edges of the door, and are slidably received within the grooves provided at the opposite longitudinal edges of the entrance-opening by means of longitudinal guide-strips 9. These guide-strips are fastened along one edge to the drum and are offset to form the groove for the reception of the edges of the door, the other edge being bent inwardly around the stiffening-ribs 8. By reference to Fig. 3 it will be seen that the offset edge of each of these strips overhangs the adjacent edge of the entrance-opening 3 and in conjunction with said edge provides a longitudinal groove adapted to receive the respective longitudinal edge of the slidable door. Projecting laterally from the inner face of the door, centrally and near the lower edge thereof, is a stop-pin 10, adapted to engage the upper and lower edges of the entrance-opening 3, so as to limit the movement of the door, and said pin is adapted to be received within suitable notches 11 and 12, formed, respectively, in the said upper and lower edges of the entrance-opening.

The vessel for containing water consists of a pan 13, open at the top and of slightly greater diameter than the drum or casing, so as to receive the lower portion thereof within the pan. The latter is provided with an opening 14, formed through the side of the pan, and a spout 15, embracing said opening, so as to facilitate the emptying of the pan when so desired. To removably connect the pan with the lower open end of the drum, the latter is provided with diametric oppositely-disposed inwardly-extending and substantially L-shaped hooks or fingers 16, adapted to engage diametrically opposite eyes or substantially U-shaped straps 17, provided upon the upper face of the bottom of the pan 13. By reference to Fig. 2 it will be seen that the hooks are flat and extend in the plane of the bottom of the drum, so as to fit flush against the bottom of the pan, and thereby permit of the drum fitting evenly within the pan. It will be understood that the pan may be readily detached from the drum or casing by turning the pan axially, so as to disengage the flat hooks 16 from the eyes or straps 17, whereby the connection between the two members is broken and they may be separated.

As clearly shown in Fig. 2 of the drawings, the lower side 18 of the drum or casing entirely closes the discharge-opening 14 in the side of the pan 13, so that the steam generated from the water contained within the pan cannot escape through the said opening, but, on the other hand, is effectually confined within the drum. Also it will be understood that it is not necessary to lift the drum entirely out of the pan to remove or inspect any of the vessels or dishes contained within the drum, as the door may be elevated sufficiently to have access to any of the dishes as desired. Thus it will be apparent that access may be had to the interior of the drum for any desired purpose without permitting the escape of the greater part of the steam as the door is elevated but slightly to expose the lower vessel.

Changes in the form, proportion, size, and the minor details of construction within the scope of the appended claims may be resorted to without departing from the spirit or sacrificing any of the advantages of this invention.

What I claim is—

1. In a domestic steam-cooker, the combination with a drum or casing closed at the top, open at the bottom and provided at the bottom edge thereof with inwardly-disposed substantially L-shaped hooks, of a water pan or receptacle having a lateral discharge-opening provided with eyes arranged upon the bottom thereof, the latter being adapted to receive the respective hooks of the drum or casing, which rests upon the bottom of the pan and closes the discharge-opening of the same whereby the drum or casing is removably connected to the water-pan, substantially as shown and described.

2. In a domestic steam-cooker, the combination with a drum or casing, closed at the top, open at the bottom and provided with flat substantially L-shaped hooks located in the plane of the bottom of the drum and extending inward from diametrically opposite points of the drum, of a water pan or receptacle of greater diameter than the drum and provided with eyes located at diametrically opposite points upon the upper face of the bottom of the pan, said eyes being adapted to receive the flat hooks of the drum, whereby the latter is detachably connected to the pan and adapted to rest flat upon the bottom thereof, substantially as shown and described.

In testimony that I claim the foregoing as my own I have hereto affixed my signature in the presence of two witnesses.

THOMAS PERRIN.

Witnesses:
H. L. PORTER,
A. M. SRADEL.